(12) United States Patent
Pai et al.

(10) Patent No.: US 10,027,725 B2
(45) Date of Patent: Jul. 17, 2018

(54) SYSTEM AND METHOD FOR CASCADED PEER-2-PEER VIDEO CONFERENCES

(71) Applicant: Polycom, Inc., San Jose, CA (US)

(72) Inventors: Deep Subhash Pai, Pune (IN); Dragan Ignjatic, Belgrade (RS)

(73) Assignee: Polycom, Inc., San Jose, CA (US)

( * ) Notice: Subject to any disclaimer, the term of this patent is extended or adjusted under 35 U.S.C. 154(b) by 49 days.

(21) Appl. No.: 15/221,398

(22) Filed: Jul. 27, 2016

(65) Prior Publication Data

US 2017/0359392 A1    Dec. 14, 2017

(30) Foreign Application Priority Data

Jun. 13, 2016 (IN) .............................. 201631020158

(51) Int. Cl.
| | |
|---|---|
| H04L 12/16 | (2006.01) |
| H04L 12/26 | (2006.01) |
| G06F 15/16 | (2006.01) |
| H04N 7/14 | (2006.01) |
| H04L 29/06 | (2006.01) |
| H04L 29/08 | (2006.01) |
| H04W 40/22 | (2009.01) |

(52) U.S. Cl.
CPC ........ *H04L 65/403* (2013.01); *H04L 65/1069* (2013.01); *H04L 65/605* (2013.01); *H04L 65/80* (2013.01); *H04L 67/104* (2013.01); *H04W 40/22* (2013.01)

(58) Field of Classification Search
CPC . H04L 65/403; H04L 65/1069; H04L 67/104; H04W 40/22; H04W 72/042; H04W 72/0413; H04W 84/18
See application file for complete search history.

(56) References Cited

U.S. PATENT DOCUMENTS

| | | | |
|---|---|---|---|
| 2011/0246658 A1* | 10/2011 | Dettori | H04L 67/1008 709/231 |
| 2012/0147127 A1* | 6/2012 | Satterlee | H04N 7/152 348/14.08 |
| 2012/0275333 A1* | 11/2012 | Cociglio | H04L 43/106 370/252 |
| 2014/0118473 A1* | 5/2014 | Halavy | H04N 7/152 348/14.09 |
| 2016/0021149 A1* | 1/2016 | Maistri | H04L 65/403 348/14.08 |

* cited by examiner

*Primary Examiner* — Kiet Tang
(74) *Attorney, Agent, or Firm* — Blank Rome, LLP

(57) ABSTRACT

A P2P configuration where only the active talker or talkers are providing media streams, to reduce uplink bandwidth demands on an active talker, participants relay the active talker stream to other participants. A signaling server determines the closest participant receiving a requested stream and with available bandwidth to relay the requested stream to a requesting participant and controls the provision of the relayed stream. In certain cases, an additional intermediate participant may relay the requested stream.

6 Claims, 4 Drawing Sheets

- - - - - Signaling
———— Media

- - - - - Signaling
———— Media

SYSTEM AND METHOD FOR CASCADED PEER-2-PEER VIDEO CONFERENCES

RELATED APPLICATIONS

This application claims priority under 35 U.S.C. § 119 to Indian Patent Application No. 201631 020158 filed on Jun. 13, 2016, the entire content of which is hereby incorporated by reference.

BACKGROUND

FIG. 1 illustrates a full mesh peer-to-peer (P2P) videoconference that is achieved by setting up independent audio/video real-time RTP streams between each participant 102, 104, 106, 108 of the conference such that each participant 102, 104, 106, 108 transmits one audio/video (and possibly content) stream to each other participant 102, 104, 106, 108 and receives the same from each other participant 102, 104, 106, 108 as shown. A signaling server no coordinates the streams. The main advantage of a full mesh conference by way of comparison to the more traditional centralized bridge conference method is the lower latency of media and the elimination of bottlenecks in the form of centralized media servers. The main disadvantage of full mesh approach is that more bandwidth is required to set up video streams to send and received video from every participant in the conference.

Let us assume that each participant in a full mesh P2P videoconference is sending video at 'K' kbps. Then for a conference with 'N' participants the amount of uplink bandwidth and downlink bandwidth required at each participant will be $K*(N-1)$. For 512 kbps video and six participants, the bandwidth required will be upwards of 2.5 Mbps in each direction for each participant.

FIG. 2 illustrates one way to mitigate the bandwidth problems of the full mesh is to limit the number of participants transmitting video (so it is no longer "full" mesh) to a relatively small subset. For example, one possible subset could be that only video of the active speaker is visible to all as shown in FIG. 2. In FIG. 2 Participant 1 202 is the active speaker and has streams to each of the other participants 204, 206, 208, with the signaling server 210 controlling the streams. This technique can be extended to include multiple videos from say the two most recent active speakers. Such a policy will limit the number of participants transmitting video and hence the amount of downlink bandwidth required. With video at 'K' kbps, 'N' total participants and 'A' active participants transmitting video, the amount of uplink bandwidth used for video at non-active participants will be zero. The downlink bandwidth at each non-active participant will be $K*A$ and $K*(A-1)$ for active participants. But the uplink bandwidth at each active participant will still be $K*(N-1)$. In cases where there are more active participants than a certain threshold, a secondary selection algorithm can be employed. The obvious choice there is to limit the "active" set by picking the A loudest participants. This is similar to how audio bridges select only two or three audio streams to mix for inactive participants and all other ones are muted.

So as demonstrated above, the mesh approach limits the size of a given conference to a small number of participants depending on available uplink bandwidth to peers.

SUMMARY

In a P2P configuration where only the active talker or talkers are providing media streams, to reduce uplink bandwidth demands on an active talker, participants relay the active talker stream to other participants. A signaling server determines the closest participant receiving a requested stream and with available bandwidth to relay the requested stream to a requesting participant and controls the provision of the relayed stream. In certain cases, an additional intermediate participant may relay the requested stream.

BRIEF DESCRIPTION OF THE FIGURES

The accompanying drawings, which are incorporated in and constitute a part of this specification, illustrate an implementation of apparatus and methods consistent with the present invention and, together with the detailed description, serve to explain advantages and principles consistent with the invention.

DETAILED DESCRIPTION OF THE PREFERRED EMBODIMENTS

In embodiments according to the present invention, the non-active participants of a videoconference are used to relay the video streams of the active participants, thus forming a cascading media architecture.

Figure 1:
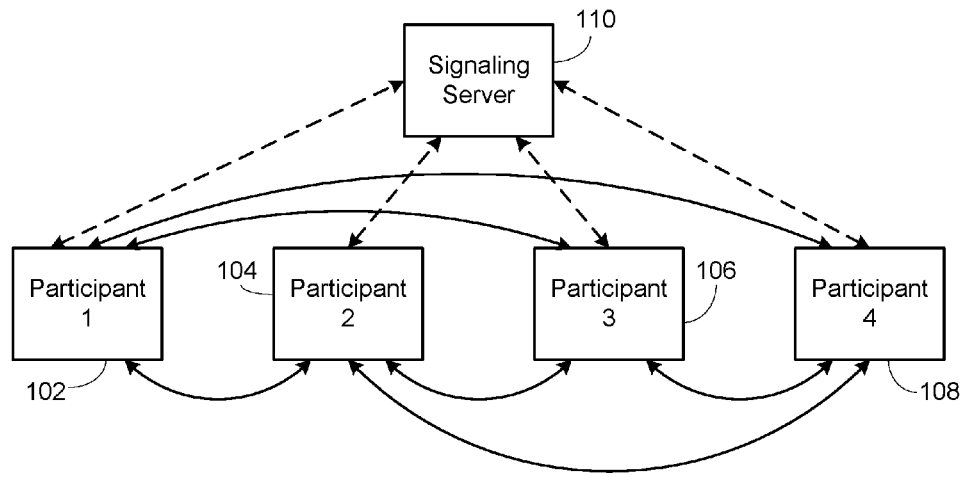
FIG. 1 is a block diagram illustrating connections and operations of a videoconferencing configuration according to the prior art.
Figure 2:
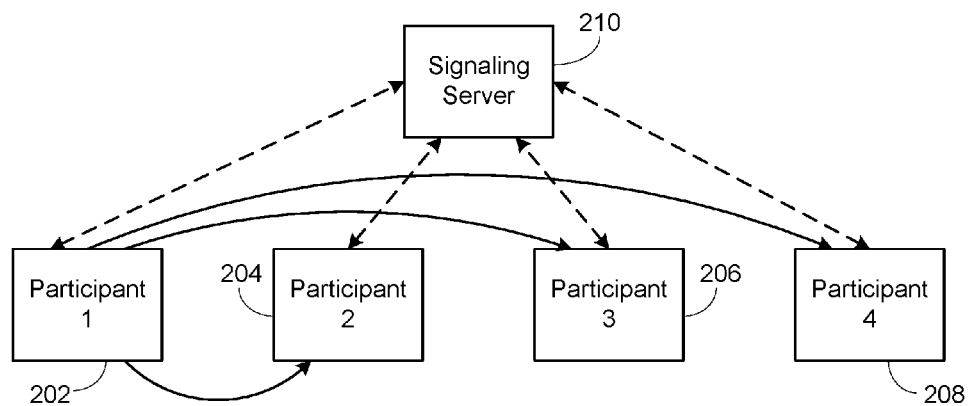
FIG. 2 is a block diagram illustrating connections and operations of a peer-to-peer videoconferencing configuration of an alternate embodiment to FIG. 1.

As explained above, the non-active (N-A) participants will not be transmitting their video and hence their uplink bandwidth utilization will be limited to audio, which has an order of magnitude lower bitrate requirements. According to the present invention, this available uplink bandwidth is utilized to relay the streams of the active participants. In this approach, the active participants will not stream their videos to all the other (N-1) participants but to only a few participants that are capable of cascading their streams further. These types of participants are referred to as "cascading participants" in this document. This reduces the uplink bandwidth requirements of active speaker participants as compared to the FIG. 2 alternative where the streams are provided to all participants.

Figure 3:
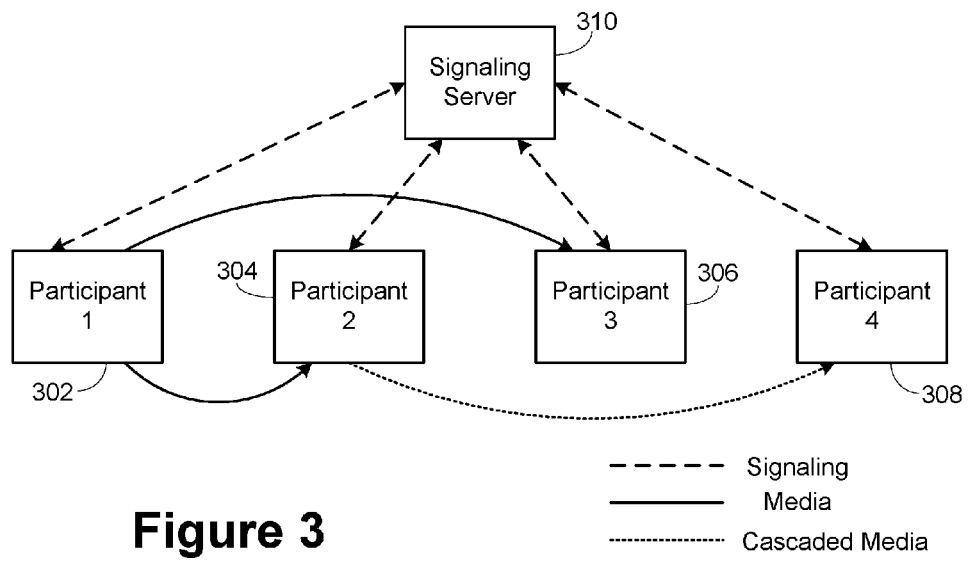
FIG. 3 is a block diagram illustrating connections and operations of a peer-to-peer videoconferencing configuration of a first embodiment according to the present invention.

This is shown in FIG. 3. Participant 1 302 is the active speaker. Participant 1 302 provides streams to Participant 2 304 and Participant 3 306. Participant 2 304 provides Participant 1's stream to Participant 4 308. The signaling server 310 is coordinating the various streams.

The participants relaying a stream from an active participant can relay that same stream to multiple other participants and/or can also be relaying multiple streams from multiple active participants, depending on their uplink bandwidth as well as other factors such as CPU cycles, memory, etc.

Figure 4:
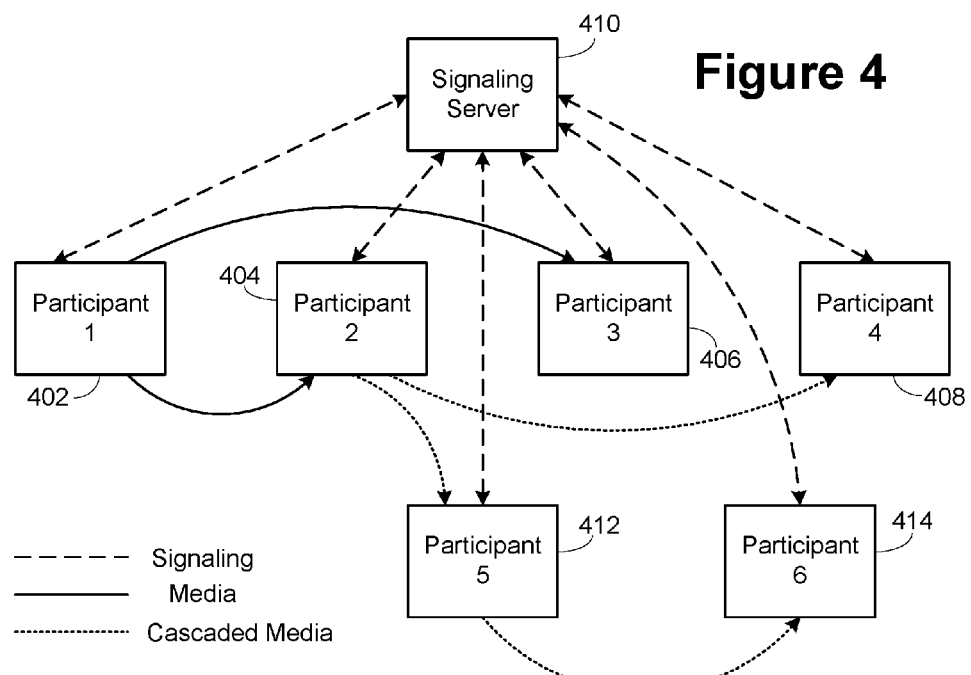
FIG. 4 is a block diagram illustrating connections and operations of a peer-to-peer videoconferencing configuration of a second embodiment according to the present invention.

These relayed streams can take multiple hops, i.e. cascade to multiple participants, before terminating on an endpoint as shown in FIG. 4. Each hop adds latency but also increases the number of participants in a conference. The goal is to deliver the video stream in the least number of hops and with the least latency.

As shown in FIG. 4, Participant 1 402 is the active talker and provides its streams directly to Participant 2 404 and Participant 3 406 as in FIG. 3. Also as in FIG. 3, Participant 2 404 relays Participant 1's stream to Participant 4 408. An additional Participant 5 412 is present and receives Participant 1's stream from Participant 2 404. Participant 5 412 then relays Participant 1's stream to Participant 6 414. The signaling server 410 controls the various streams.

Optionally, a cascading participant can choose to do local compositing of multiple video streams before forwarding it further in order to trade off local CPU cycles for its uplink bandwidth.

Optionally, a cascading participant can change the quality, bitrate, framerate and resolution of a video stream before forwarding it further in order to trade off local CPU cycles for its uplink bandwidth.

The signaling server is responsible for setting up the media channels between the participants. It is responsible for determining how video streams are delivered and if they need to be cascaded and what route they should take.

Figure 5:
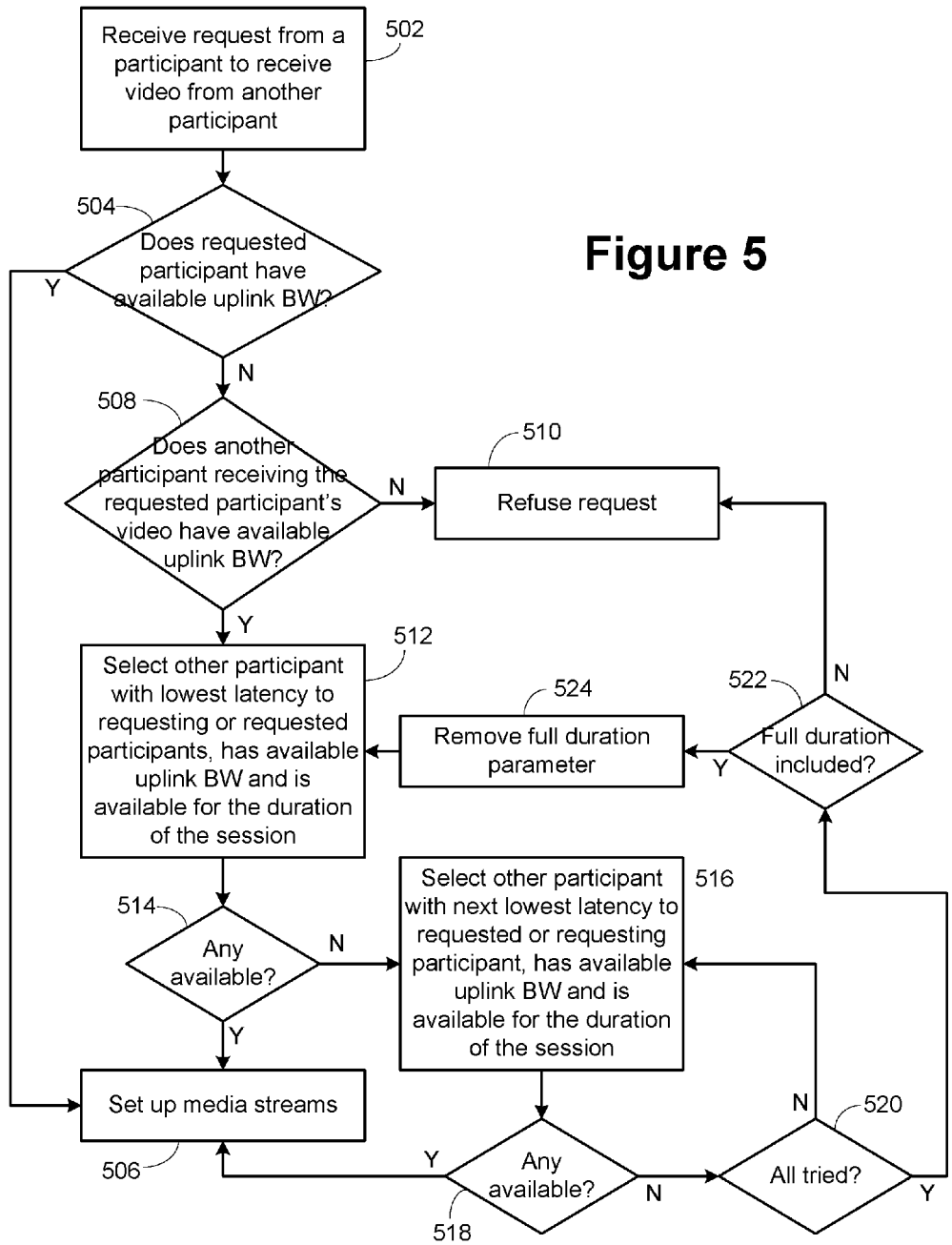
FIG. 5 is a flowchart of operations according to the present invention.

When a participant joins a conference, the signaling server requests/computes the following information about that participant:
  Total uplink capacity of the participant
  P2P uplink bandwidth, downlink bandwidth and latency between each participants
  CPU and memory capacity of participant endpoint
  Geo-location of participant
  Calendar and presence information Referring to FIG. 5, and referencing FIGS. 3 and 4, when a participant (say Participant 4) requests a video stream from any other participant (say Participant 1), the signaling server does the following:

The signaling server receives the request in step 502. In step 504 the streaming server checks if Participant 1, the requested participant, has available uplink bandwidth to send a video stream to Participant 4, the requesting participant. If so, in step 506 the signaling server initiates media stream setup between Participant 1 and Participant 4, the requested and requesting participants.

In step 508 if the requested participant, Participant 1, does not have uplink capacity, as in FIG. 3, then the signaling server checks if any other participant that is currently receiving the stream from the requested participant can relay that stream to the requesting participant, Participant 4, that is, does the participant have sufficient uplink bandwidth to provide an additional stream.

If a participant is not available, in step 510 the request is refused. If a participant is available, in step 512 the signaling server chooses a participant that:
  a. Has the lowest latency with the requested or requesting participants
  b. Has available uplink bandwidth
  c. Is determined to be available for the entire duration of the conference using his calendar information and presence information. This ensures that the cascading participant has least probability of exiting the conference resulting in rearranging/renegotiation of media streams.

If such a participant is available, in step 506 the media stream is configured. If no participant is available that meets these parameters, in step 516 the signaling server relaxes the latency parameter, which allows the inclusion of an intermediate hop as in FIG. 4. Step 512 would have resulted in the streams to Participant 4 408 and Participant 5 412. The relaxation of step 516 would result in the stream from Participant 5 412 to Participant 6 414.

If any participant is available for that pass through step 516, as determined in step 518, then in step 506 the media stream is set up. If no participants are available at the given level of relaxation, in step 520 the signaling server determines if all participants at all hop levels have been reviewed. If not, then step 516 is performed with a further level of relaxation. If all levels of relaxation have been tried, in step 522 the signaling server determines is the full duration parameter is still present in the evaluations. As mentioned, it is preferable that the cascades be done using participants that will be present for the duration of the session to avoid reconfiguring, but if no participant is available for the full duration, then in step 524 the full duration parameter is removed from the evaluation and step 512 is performed without the duration parameter. This results in the various shop calculations being performed again without the duration restriction. If after removing the duration parameter there is still no available participant, which should not be the case as entry into the cascade evaluation loop required that there be a participant with available uplink bandwidth, then after step 522 the request is refused in step 510.

At any point, the signaling server can rearrange/renegotiate the media streams if the characteristics of the network change. For example, if a cascaded participant leaves the conference or a new participant joins that has a very high uplink and very low latency, the signaling server may move the relay streams to this new participant. In addition, participants can constantly probe their bandwidth and report any significant changes (transient congestions) to signaling server, which may then alter the media stream tree.

To maintain audio and video synchronization, it is preferable to cascade the audio streams in addition to the video streams, such that the audio and video streams follow the same path (i.e. the same sequence of cascaded participants) in the mesh network. However, audio is much more sensitive to latency and as such a different policy may be preferable. One possible policy is to have a fixed cascading tree for audio (irrespective of the video path), so that audio is continuous and undisturbed by any change in video stream cascading.

This can be further extended to not just video, but any streams such as data, collaboration, content and screen sharing.

When the number of participants exceeds the capacity of the total network, i.e. a participant joins but there are no resources available to relay the video stream from any existing participants, then the new participants will receive only audio streams along with a static image (say the profile image) of the active speaking participant. This would ensure a completely scalable architecture that degrades the quality of experience with scale.

In another embodiment, a variation is to make use of participants of a first conference (say one with very few participants) to relay streams of participants of a second conference (say one with a larger number of participants). This cross cascading appears transparent to the participants of the first conference and extra precautions are required to ensure that the privacy of a conference is not violated.

Figure 6:
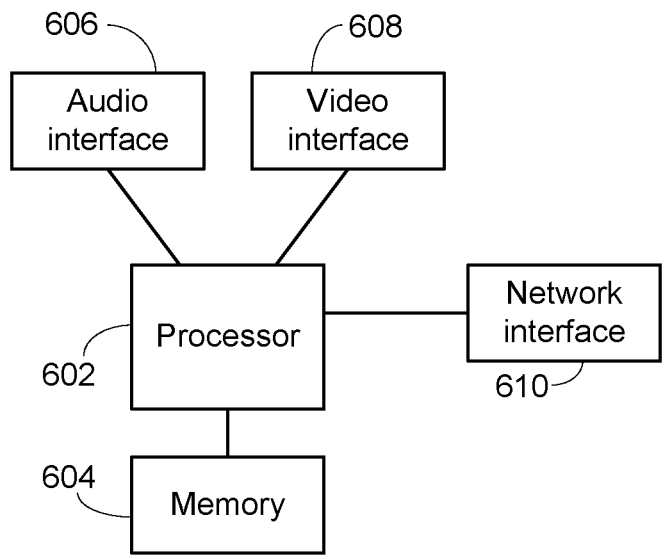
FIG. 6 is a block diagram of an endpoint according to the present invention.

FIG. 6 is a block diagram of an exemplary endpoint used by participants in the videoconference. A processor 602 is the primary computing element which handles the user interface, provides the audio and video codec functions and communicates with the signaling server. A memory 604 having volatile and non-volatile portions is connected to the processor 602 to provide working memory and to store the programs which execute on the processor 602 to provide the indicated functions. An audio interface 606 coupled to the processor 602 is connected to microphones to receive audio and to a loudspeaker to provide audio output. A video interface 608 coupled to the processor 602 is connected to a camera to provide the video input and to a monitor or other display to show the other participants. A network interface 610 coupled to the processor 602 is used to communicate with the other participants and the signaling server over the network connecting the various devices.

Figure 7:
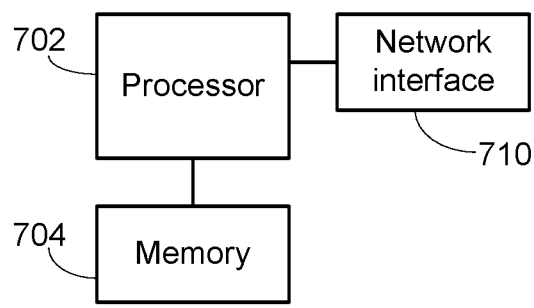
FIG. 7 is a block diagram of signaling server according to the present invention.

FIG. 7 is a block diagram of an exemplary signaling server. A processor 702 is the primary computing element which handles the management and connections of the videoconference and communicates with the participants and the recording server. A memory 704 having volatile and non-volatile portions is connected to the processor 702 to provide working memory and to store the programs which execute on the processor 702 to provide the indicated functions. A network interface 710 coupled to the processor 702 is used to communicate with the other participants and the recording server over the network connecting the various devices.

Note that although the above description has used the example of a set of active speaking participants as the only ones to transmit video, the above architecture is not limited to that. It can be applied to a full mesh conference as well.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A signaling server for use in a peer-to-peer videoconference session with a plurality of endpoints, the signaling server comprising:
   a network interface for communicating with the plurality of endpoints;
   a processor coupled to the network interface; and
   a memory coupled to the processor and storing programs which when executed cause the processor to perform a method comprising the steps of:
      receiving at least one request from a requesting endpoint to receive a stream from an active talker endpoint;
      determining a relay endpoint receiving the stream from the active talker endpoint and having sufficient uplink bandwidth to relay the stream; and
      setting up a one way media stream from the relay endpoint to the requesting endpoint,
   wherein the step of determining includes determining if the relay endpoint will be present in the videoconference session for the same duration as the requesting endpoint.

2. The signaling server of claim 1, wherein the step of determining includes determining an endpoint with the lowest latency to both the requesting endpoint and the active talker endpoint as the relay endpoint.

3. The signaling server of claim 1, wherein the step of determining includes determining an intermediate endpoint to relay the media stream from the relay endpoint to the requesting endpoint.

4. A method of developing a full peer-to-peer videoconference session with a plurality of endpoints and a signaling server, the method comprising the steps of:
   receiving at least one request from a requesting endpoint to receive a stream from an active talker endpoint;
   determining a relay endpoint receiving the stream from the active talker endpoint and having sufficient uplink bandwidth to relay the stream; and
   setting up a one way media stream from the relay endpoint to the requesting endpoint,
   wherein the step of determining includes determining if the relay endpoint will be present in the videoconference session for the same duration as the requesting endpoint.

5. The method of claim 4, wherein the step of determining includes determining an endpoint with the lowest latency to both the requesting endpoint and the active talker endpoint as the relay endpoint.

6. The method of claim 4, wherein the step of determining includes determining an intermediate endpoint to relay the media stream from the relay endpoint to the requesting endpoint.

* * * * *